…

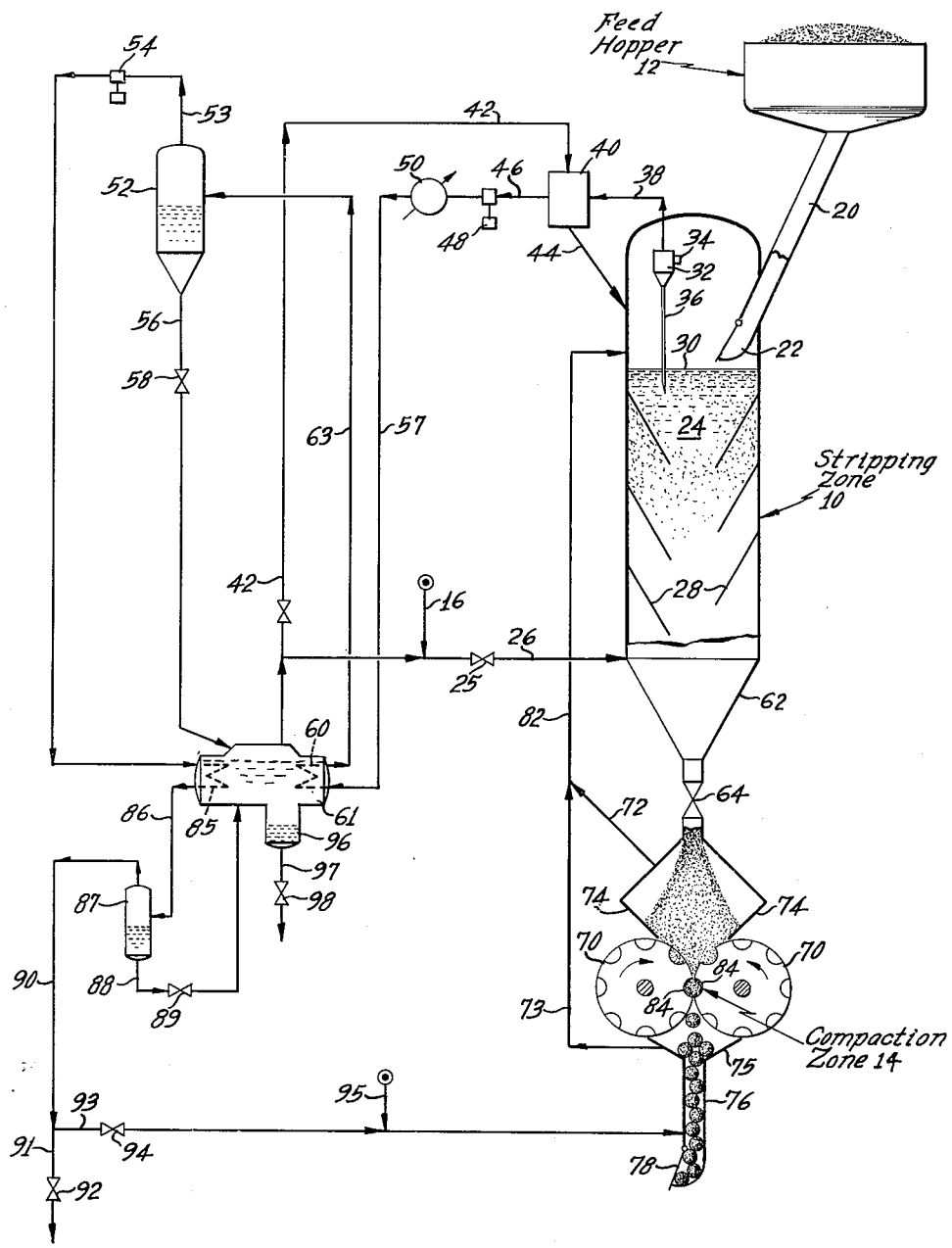
INVENTOR.
Robert W. Pfeiffer

United States Patent Office 3,231,649
Patented Jan. 25, 1966

3,231,649
COMPACTION METHOD
Robert W. Pfeiffer, Bronxville, N.Y., assignor to Pullman Incorporated, Chicago, Ill., a corporation of Delaware
Filed Apr. 17, 1964, Ser. No. 360,507
15 Claims. (Cl. 264—111)

The present invention relates to the compaction of particulate material and, more specifically, it relates to a method of treating particulate material prior to and during compaction in order to achieve compacted materials of improved properties. Still more particularly, this invention relates to the removal of entrapped and entrained air from particulate metal prior to compacting same to provide compacts of increased density and thereby to reduce re-oxidation of the metal compact.

Prior methods relating to the compaction of metal particles into compacts of increased density have, on the one hand, involved the use of varied and numerous types of lubricants and binder materials. On the other hand, U.S. Patent No. 2,198,612 discloses a method for improving metal particle compaction processes by carrying out the compaction in a vacuum chamber. While such prior methods have in themselves led to improvements in both density and re-oxidation characteristics of the ultimate compact, the lubricant approach is expensive and provides further problems with the remainder of undesirable residues in the compacted product. The vacuum compaction approach is extremely expensive, especially where large throughputs and compaction rates are employed.

It is, therefore, an object of the present invention to overcome and eliminate the inherent disadvantages of prior compaction methods and to provide an improved method for compacting particulate material yielding compacted material having improved properties which method is more efficient and economical than prior methods, particularly where high compaction rates are employed, and more particularly, where compaction is carried out to nearly theoretical densities at high rates of compaction.

Another object of the present invention is to provide an improved method for the compaction of particulate material comprising metal and metal oxide mixtures.

Another object of the present invention is to provide an efficient method for removal of entrapped non-condensable gaseous material from the particulate solids feed prior to the introduction of the solids to a compaction zone.

Further objects and advantages become apparent to those skilled in the art from the following description and disclosure.

The objects are generally accomplished in accordance with the present invention by vapor stripping a particulate solid feed material prior to a compaction step to remove non-condensable gaseous material associated with the solid material, employing as a stripping agent a material which is a vapor under the pressure and temperature conditions employed in the stripping zone, and which material is condensable under compaction conditions, including the temperature and pressure employed in a compaction zone. The particulate solid feed material treated with such a condensable stripping agent is passed to a suitable compaction zone in which a compacted product is produced in the presence of the condensable stripping agent. The term "non-condensable gaseous material," as employed herein, means gaseous material which is not capable of being condensed under the conditions which prevail in the compaction zone.

It is essential that the stripping agent selected for use in connection with the method of the present invention is condensable under conditions employed in the compaction zone. Vapors are selected as stripping agents which have a critical temperature greater than the maximum temperature achieved during compaction and which have a critical pressure less than the maximum superficial compaction pressure. The superficial compaction pressure is defined herein as the total applied force divided by the cross-sectional area of the compact. It is desirable to select stripping vapors which are non-flammable, non-toxic, and inert with respect to the solid material under the conditions at which such material is to be treated in the process. Considering only the effect of pressure and temperature on the stripping agents, the preferable condensable stripping agents employed in the method of the present invention are selected from the group consisting of difluorodichloromethane, monochlorodifluoromethane, sulfur dioxide, ammonia, methyl chloride, propane, and methyl ether. Steam and carbon dioxide can be employed as condensable vapor stripping agents by operating the stripping zone at suitably elevated and reduced temperature conditions, respectively, such that the two-named compounds or similar compounds remain in the vapor phase in the stripping zone and are condensable in the compaction zone.

The solid feed material is preferably comminuted prior to passing such material to the vapor stripping zone and has a particle size distribution such that the particulate material is readily fluidizable in the stripping zone. Fluidizable particles having non-condensable gaseous material associated therewith are preferably countercurrently contacted in an elongated, vertically disposed stripping zone with upflowing condensable vapor stripping agent, wherein the condensable vapor admixed with separated non-condensable material is separated from solid material in an upper portion of the stripping zone. Preferably, a condensable vapor stripping agent is selected which has, in addition to its essential properties which permit such vapor to condense under compaction conditions as previously set forth, properties such that the stripping agent remains a vapor during the stripping operation which is preferably maintained under essentially atmospheric temperature and pressure conditions. Stripping conditions of temperature and pressure can be adjusted, however, to maintain in the vaporous state stripping agents which have properties such that they are particularly advantageous for use in the compaction step, but which are normally liquid under atmospheric conditions, and stripping conditions can be adjusted also to promote the efficient removal of non-condensable material from the solids. On the other hand, stripping conditions can be adjusted to maintain in a potentially condensable state stripping agents having properties such that they are particularly advantageous for use in the compaction step, but which are normally not condensable in the compaction step because of low critical temperatures.

The method of the present invention is useful particularly in the compaction of metals and metal-metal oxide mixtures by any of the known compaction methods and means. However, the method of the present invention is likewise useful in improving the compaction of other suitable materials such as, for example, lime, fertilizer salts, and various other organic and inorganic materials.

Having thus described the method of the present invention in general terms, reference is now had to the drawing which shows diagrammatically, in elevation, one embodiment of the method of the present invention employed in stripping non-condensable gaseous material from a metallic powder, or other suitable particulate material, with condensable vapor, as hereinbefore defined, prior to compacting the particles in a briquetting press, or in other suitable compaction means.

Feed hopper 12 is filled with metal particles, for example, which are readily fluidizable in stripping zone 10. Preferably, such particles pass about a 16 to about 325 mesh screen, although the top size may range as high as ½ inch for satisfactory operation in the stripping zone, as shown. The particulate material is withdrawn from feed hopper 12 by means of conduit 20 having flapper or trickle valve 22 situated therein and passed by gravity into stripping zone 10 discharging at a point adjacent to the upper level 30 of the dense bed of particles 24 maintained therein. The particulate material in stripping zone 10 is maintained in a dense fluidized condition by the introduction of a condensable vapor stripping agent in line 26 at a rate sufficient to maintain the fluidization. Preferably, a superficial gas velocity between about 0.1 and about 5.0 ft./sec. is maintained in the stripping zone for the purposes of fluidization. The countercurrent contact achieved between the fluidized particles and condensable vapor stripping agent rapidly displaces non-condensable material, such as entrapped and entrained air which has become associated with the particles during atmospheric storage. Baffles 28 are preferably provided within the stripping zone in order to provide a tortuous path for the countercurrent passage of solids and gaseous material thereby improving the stripping action. While stripping zone 10, shown in the drawing, comprises an elongated, vertically disposed cylindrical chamber adapted with suitable baffle means, it is to be understood that any suitable stripping means can be employed. For example, any of the stripping means such as those which are employed in the removal of hydrocarbonaceous residues from catalyst in the catalytic cracking art can be employed in conjunction with the method of the present invention. A dilute phase of fine particulate material and gaseous material including condensable vapor and displaced non-condensable material is maintained above meniscus 30 in the upper portion of zone 10. Cyclone separator 32 or other suitable gas-solid separation means is provided internally of stripper 10 within the dilute phase, but such separation means can be externally located, if desired. A portion of the solid and gaseous material in the dilute phase enters the cyclone through conduit 34. Recovered solid particulate material is returned to dense bed 24 by means of dipleg 36, and the separated gaseous material is withdrawn in line 38. The gaseous material is then passed to a condensable vapor recovery and air removal system, if warranted by economic considerations, such as the initial cost of vapor stripping agent balanced against the cost of recovery.

In the practice of the present invention, it has been found that a fluorocarbon gas such as, for example, Freon–12 ($CCl_2F_2$), is well-suited as a condensable vapor stripping agent for the purposes of the present invention. A preferred method of recovering approximately 96 percent of such Freon gas from a Freon-air mixture withdrawn from the stripping zone is shown in the drawing in which method the recovered Freon is recycled to the stripping zone as a vapor stripping agent, thereby reducing the net consumption of Freon.

A gaseous mixture containing Freon–12, air, and a considerable amount of dust from the stripping zone is withdrawn in line 38 and passed to suitable gas cleaning means. In the drawing, zone 40 represents a filtration zone suitable for recovering the dust from the gaseous mixture. Blow-back gas is provided for the filters in line 42, and blow-back gas along with dust material removed from the filtered gas is returned to the stripping zone in line 44, preferably below level 30. The filtered mixture of Freon and air is passed through line 46, which preferably contains replaceable guard filters for removing the final traces of dust from the gaseous mixture prior to its introduction into pressurizing zone 48. Pressurizing zone 48 comprises either a single or plural stage compressor with interstage cooling depending upon the compression requirements of the system. Compressed material at about 114 p.s.i.g., in this example, is reduced in temperature in cooler 50 and passed in line 57 to condenser coil 60 which is immersed in boiling liquid Freon–12 maintained at about 35° F. and contained in tank 61. Outlet conditions in coil 60 are maintained at about 45° F. such that the major portion of the Freon in the entering gaseous mixture is condensed. The mixture at 45° F. containing gaseous air and liquid Freon is passed to gas-liquid separator 52 in line 63; and the mixture in line 63 is discharged into the vapor space above the liquid in separator 52 under conditions such that substantial separation between liquid and vapor is achieved. Freon liquid is withdrawn from separator 52 in line 56, reduced in pressure to about 32 p.s.i.g. by means of valve 58 and flashed into the vapor space above the liquid contained in tank 61. Vapor is withdrawn from separator 52 in line 53, which vapor still contains a substantial percentage of Freon at this point, e.g., about 50 mol percent. The vapor in line 53 is pressurized to about 375 p.s.i.g. by means of compressor 54 and passed to condenser coil 85 immersed in the Freon liquid maintained at 35° F. in tank 61. Substantially all of the Freon is condensed in coil 85 and a mixture of gaseous air and liquid Freon at about 45° F. is passed in line 86 to separator 87. Liquid Freon is withdrawn from separator 87 in line 88, reduced in pressure by means of valve 89 and returned to the liquid reservoir in tank 61. Alternatively, this liquid material is passed to the liquid reservoir contained in separator 52.

A bottom portion of tank 61, shown in the drawing, is adapted with an extended means 96 which functions as a water separator. Because of the initial moisture content of the non-condensable gaseous material which is displaced by the Freon gas in stripping zone 10, a provision, such as separator 96, should be made in the system in order to allow for separation of water from the Freon recycled to the stripping zone. Since the specific gravity of water is greater than that of the Freon and since water and Freon are essentially immiscible under the conditions employed, the water separates at the bottom of separator 96 forming a well-defined interface with the Freon. Water is withdrawn continuously or periodically as necessary through valve 98 in line 97. Temperatures are limited to about 35° F., as a minimum, in the vapor recovery system to avoid freezing any water which may be present.

Freon vapor is withdrawn from the vapor space maintained above the boiling liquid in tank 61 and recycled to the stripping zone 10 in line 26 at a rate controlled by valve 25. Generally, tank 61 is maintained under a pressure of at least 15 p.s.i.g. and a temperature of at least 35° F. to insure control and prevent freezing of water. Freon make-up is introduced as needed in line 16 from a cylinder or other suitable source.

Referring again to separator 87, the vapor withdrawn overhead thereof is rich in air and contains a Freon concentration as low as is economically practicable, of about 15 mol percent. This gaseous mixture is passed in line 90 in part to vent stream 91 at a rate controlled by valve 92, and the remainder of the gaseous material is passed through valve 94 in line 93 to briquet stripping zone 76 in order to increase the recovery of Freon.

Referring now to the stripped particulate material treated in stripping zone 10, such material is collected in funnel-shaped bottom 62 or other suitable means. The particulate material, at this point, has condensable vapor associated therewith, the condensable vapor having displaced substantially all of the entrapped non-condensable material in the feed. The stripped particles and entrained condensable vapor are withdrawn from the stripping zone through valve means 64 to compaction zone 14. For the purposes of illustration, an example is now given showing the compaction zone employed in the production of briquets from about 10 mesh sponge iron particles which were stripped with Freon-12 vapor in a zone such as stripping zone 10. In this example, compaction zone 14 comprises two co-acting briquetting rolls 70. Seal plates and housing 74 are provided to contain the tions, the total volume of stripping vapor is, preferably, between about four and six times the volume of entrained air entering with the solids.

Table I

| Briquet-ting Run Number | Type Feed | Briquet Weight, Grams | Drop-Shatter-Test Score, 0 to 100 | Apparent Density, g./ml. | Percent of Theo-retical Density |
|---|---|---|---|---|---|
| A | HyL Sponge Iron, no stripping | 50.1 | | 4.71 | 71 |
| B | HyL Sponge Iron stripped with Freon-12 vapor ($CCl_2F_2$). | 51.2 | | 5.19 | 79 |
| C | High-grade Sponge Iron, no stripping. | 52.0 | [1] 87.8 | 6.22 | 81 |
| D | High-grade Sponge Iron stripped with Freon-12 ($CCl_2F_2$). | 56.3 | [1] 92.5 | 6.38 | 84 |

[1] Average result of eight drops.

metal particles and to permit recovery of Freon vapor therefrom by means of line 72. Conduit 76 having trickle or flapper valve 78 situated at the terminal portion thereof is provided as a means for withdrawing briquets formed in the compaction zone from elongated zone 76 situated below discharge housing 75. In the operation of compaction zone 14, metal particles withdrawn from stripping zone 10 at a rate of about 2000 pounds per hour, in this example, are introduced to housing 74. The housing is maintained under a pressure slightly less than atmospheric, e.g., between about 0.1 and about 10 inches of water vacuum by means of the suction created by compressor 48 in line 46. Entrapped and entrained air which is ordinarily present in the metal particles by reason of atmospheric storage, e.g., in feed hopper 12, is largely displaced in stripping zone 10 by the Freon vapor which is condensable under the superficial compaction pressure achieved in grooves 84 of compaction rolls 70. The approximate superficial pressure, i.e., the force applied divided by the cross-sectional area of the grooves is about 55,000 p.s.i., in this example. Generally, the superficial briquetting pressure for sponge iron is between about 30,000 and 60,000 p.s.i. The speed of the rolls is, e.g., about 20 r.p.m. The briquets obtained from rolls 70 pass downwardly from discharge housing 75 in conduit 76 countercurrent to upflowing recycled gaseous material introduced by means of line 93 into zone 76 to strip small amounts of Freon vapor which remain associated with the briquets after compaction in order to reduce the loss of Freon from the system. The air-rich mixture of Freon and air in conduit 76 is passed by means of lines 73 and 82 to the dilute phase maintained above dense bed 24 in zone 10, and thence to the separation system hereinabove described for the recovery of the Freon. As an alternative method of operation when employing a condensable vapor which is relatively inexpensive and which has properties such that it may be safely discharged to the atmosphere, the gas recovery system is eliminated. It still may be desirable to strip entrained condensable vapor from the compacted material, however; and for this purpose air is introduced to zone 76 maintained under subatmospheric pressure from lines 95 and 93. The stripping gas is removed from discharge housing 75 in line 73 and passed to a safe discharge location by suitable means. The following comparative test data presented in Table I illustrate the improvement in density which is obtained by stripping the sponge iron material specified in Table II in accordance with the present invention by counter-current contact with Freon-12 vapor in a fluidized particle stripping zone, e.g., zone 10. On the stripped samples in Table I, the total quantity of Freon-12 admitted to the stripping zone was about 0.1 s.c.f. Freon per pound of solids. The superficial gas velocity in the stripping zone was about 1.1 ft./sec. Expressed another way, the total volume of Freon vapor was about thirteen times the volume of entrained air entering with the solids. In commercial opera- The HyL sponge iron used in tests A and B of Table I was a uniform mixture of beneficiated HyL sponge iron fines (98% minus 4 mesh). Based on chemical analyses, a weighted average analysis for the mixture is listed below in Table II:

Table II

|  | Percent |
|---|---|
| Metallic Fe | 79.7 |
| Total Fe | 88.0 |
| Percent metallization | 90.6 |
| Carbon | 2.68 |
| Sulfur | 0.017 |
| Phosphorus | 0.389 |
| Insolubles | 4.53 |

The tests showed a ten percent increase in the apparent density of HyL roll press briquets when the entrapped air was replaced by the Freon-12 condensable vapor stripping agent prior to the actual compaction step. The corresponding increase in percent of theoretical density which was achieved is expected to produce a marked improvement in the re-oxidation resistance of the product briquets during outdoor storage. There was no significant change in the strength of the two HyL briquet samples as measured by the Drop-Shatter-Test method.

The high-grade sponge iron referred to in Table I for tests C and D had a particle size range of 40 to 100 mesh and contained 98% total Fe. It is believed that the significant and unexpected improvement in regard to all measured properties resulting from stripping the high grade sponge iron, shown in Table I above, is explained because of its greater susceptibility for entrapment of air by reason of its (1) finer porosity, (2) higher compressibility, and (3) generally smaller particle size of the high grade sponge iron. These results indicate that significant improvement can be achieved by vapor stripping high grade particulate material with condensable vapor in accordance with the present invention prior to compaction.

As described above, Freon-12 was employed as a condensable vapor stripping agent for the treatment of the sponge iron particles. To satisfactorily remove non-condensable gaseous material associated with particulate material during the stripping operation, in general, any suitable vapor can be employed which has a critical temperature greater than the maximum temperature of the compaction and a critical pressure less than the maximum superficial compaction pressure, and which is a vapor or which will vaporize at the temperature and pressure conditions employed in the stripping zone. Generally, commercial compacting operations are carried out at superficial pressures above about 5,000 p.s.i. while the maximum pressure in the stripping zone, normally, is not greater than about 15 p.s.i.g., although this pressure does not constitute an upper limitation. Table III, below, shows a number of condensable stripping agents which are contemplated for use in the method of the present invention listed according to flammability and toxicity characteristics. This list is not intended to include all possible useful stripping agents but rather is intended as an illustration only. Referring to column IV, the critical pressure of each of the listed stripping agents is less than 5,000 p.s.i. and hence would be acceptable for most compaction operations. Column II shows saturation vapor temperature at 15 p.s.i.g., and column III shows critical temperature. It is apparent that the temperature of the solids in the stripping and compaction zones must be maintained between the temperatures set out in column II and column III for any given stripping agent in order that the stripping agent perform in accordance with the method of the present invention.

In order to illustrate the selection of a suitable condensable vapor stripping agent in a specific example, it is desired to introduce the particulate sponge iron feed from stripper 10 to a compaction zone at a temperature of 75° F.; and to form briquets employing a superficial compaction pressure of about 30,000 p.s.i. Under such conditions, the briquet temperature in the compaction zone will be approximately 105° F. by reason of the temperature increase in the solids due to the work of compaction. Referring to Table III, it is seen that Freon–12, Freon–114, and ammonia, for example, are acceptable vapor stripping agents under these conditions; but that carbon dioxide is not acceptable because its critical temperature is above that of the compaction zone. Freon–11 is likewise not acceptable because it is a liquid rather than a vapor in the stripping zone. It is important to note, however, that carbon dioxide can be employed if the temperature of the solids entering the compaction zone is reduced to about 50° F. or lower. Such cooling can be accomplished by introducing all or a portion of the $CO_2$ stripping agent as flashed liquid (i.e., gas and $CO_2$ snow) which vaporizes upon mixing with the feed solids in the stripping zone, thereby cooling the solids to the required temperature.

As an example of a condensable vapor stripping agent which is suitable for use in compaction processes operated at an elevated temperature, e.g., about 250° F., steam is employed which has a critical temperature of 706° F. and a critical pressure of 3206 p.s.i.a.

It is apparent that the method of the present invention has numerous advantages in the treatment of a wide range of metallic and non-metallic solid particles over a wide range of temperatures and pressures by selecting appropriate condensable vapors in accordance with the criteria hereinbefore set forth. Some important benefits which can be derived through removal of entrapped air with a condensable vapor in accordance with the method of the present invention include: (1) the achievement of higher allowable rates of compaction in compaction methods which are now limited by the adverse effect of entrapped air; (2) the attainment of higher compact densities; (3) improvement in the green strength of the compact; (4) reducing re-oxidation rates in green compacts (which is known to correlate with increased density); and (5) reducing or eliminating the required quantity of expensive binding and plasticizing materials, such as zinc stearate, which are often necessary for successful compaction. Moreover, employing the present invention, it is possible to obtain (6) a more uniform density throughout the body of the compact; (7) reduction in die wear because of the lubricating action of the condensed film; (8) elimination of oxide formation during high or low temperature compaction operations; and finally, (9) an improvement in the feeding of dies by reason of the fluidization of the feed particles. The latter is especially important in current attempts to strip roll wide sheets from metal powder or pellets, such as aluminum.

The method of the present invention has wide application to many industrial compaction processes, in addition to the briquetting of sponge iron particles such as, for example, roll press compaction employing rotating machinery, ram press compaction employing reciprocating machinery, the compaction of pellets or powders into a green sheet such as, for example, the compaction of preheated aluminum pellets into the finished sheet without a costly sintering operation being required and, as another example, the compaction of powdered organic chemicals into a continuous sheet which is then

*Table III*

| Stripping Agent | I<br>Atm. B.P., °F. (14.7 p.s.i.a.) | II<br>B.P. at 15 p.s.i.g., °F. | III<br>Critical Temp. Tc, °F. | IV<br>Critical Pressure Pc, p.s.i.a. |
|---|---|---|---|---|
| Nonflammable, non-toxic: | | | | |
| Freon-12 $CCl_2F_2$ (Difluorodichloromethane) | −22 | 10 | 233 | 582 |
| Freon-114 $C_2Cl_2F_4$ (Tetrafluorodichloroethane) | 38 | 74 | 294 | 474 |
| Nonflammable, slightly toxic: | | | | |
| Carbon dioxide $CO_2$ | −109 (subl.) | −94 | 88 | 1,072 |
| Freon-11 $CCl_3F$ (Trichloromonofluoromethane) | 75 | 116 | 388 | 635 |
| Very weakly flammable, slightly toxic: | | | | |
| Freon-22 $CHClF_2$ (Monochlorodifluoromethane) | −41 | −12 | 205 | 716 |
| Freon-21 $CHCl_2F$ (Dichloromonofluoromethane) | 48 | 83 | 353 | 750 |
| Freon-113 $C_2Cl_3F_3$ (Trichlorotrifluoroethane) | 118 | 158 | 417 | 499 |
| Methylene chloride $CH_2Cl_2$ (Dichloromethane) | 104 | 144 | 480 | 670 |
| Nonflammable, very toxic: Sulfur dioxide $SO_2$ | 14 | 45 | 315 | 1,142 |
| Flammable, toxic: | | | | |
| Ammonia $NH_3$ | −27 | −2 | 271 | 1,657 |
| Trans-dichloroethylene $C_2H_2Cl_2$ | 118 | 160 | 470 | 795 |
| Ethyl chloride $C_2H_5Cl$ | 54 | 90 | 369 | 759 |
| Methyl chloride $CH_3Cl$ | −11 | 21 | 290 | 967 |
| Methyl formate $C_2H_4O_2$ | 90 | 126 | 417 | 870 |
| Highly flammable, slightly toxic: | | | | |
| Butane $C_4H_{10}$ | 31 | 67 | 306 | 551 |
| Ethane $C_2H_6$ | −128 | −102 | 90 | 708 |
| Propane $C_3H_8$ | −44 | −12 | 206 | 617 |
| Ethylene $C_2H_4$ | −155 | −132 | 50 | 736 |
| Other Condensable Vapor Stripping Agents: | | | | |
| Methanol $CH_3OH$ | 148 | 182 | 464 | 1,156 |
| Methyl ether $CH_3OCH_3$ | −13 | 19 | 260 | 765 |
| Acetone $CH_3COCH_3$ | 132 | 173 | 455 | 690 |
| Carbon tetrachloride $CCl_4$ | 170 | 215 | 541 | 668 |
| Benzene $C_6H_6$ | 176 | 221 | 552 | 701 |
| Water (steam) $H_2O$ | 212 | 250 | 706 | 3,206 | granulated for sale of an agglomerated product, and in high-energy-rate compaction of particulate material achieved by a variety of means such as explosive discharge and electrostatic discharge.

While the method of the present invention is described herein with particular reference to the compaction of fluidizable sponge iron particles with a suitable Freon gas and by the further enumeration of other suitable condensable vapors useful as stripping agents of the present invention and by the further exemplification of fluidizable solid material which can be employed in this compaction process, it is to be understood that many modifications, alterations and substitutions may be employed without departing from the scope of the present invention. The present invention should be limited only by the claims.

What is claimed is:

1. A method of compacting particulate material which comprises: contacting particulate material having non-condensable gaseous material associated therewith with a vapor stripping agent to displace the non-condensable material, and then compacting said thus-contacted particulate material by the application of pressure in the presence of said vapor stripping agent, said vapor stripping agent having properties such that it is condensable under compaction conditions.

2. A method of compacting particulate material which comprises: contacting particulate material having non-condensable material associated therewith with a vapor stripping agent to displace the non-condensable material, and then compacting said thus-contacted particulate material by the application of pressure in the presence of said vapor stripping agent, said vapor stripping agent having properties such that it is condensable under compaction conditions and being selected from the group consisting of difluorodichloromethane, monochlorodifluoromethane, sulfur dioxide, ammonia, methyl chloride, propane, and methyl ether.

3. The method of claim 1 in which said particulate material comprises a metal.

4. The method of claim 1 in which said particulate material comprises a metal and metal oxide admixture.

5. The method of claim 1 in which said particulate material comprises sponge iron.

6. A method of compacting particulate material which comprises: contacting particulate material having entrapped non-condensable gaseous material associated therewith in a stripping zone with a vapor stripping agent to displace the entrapped non-condensable material, and then compacting particulate material separated from said stripping zone by the application of pressure in the presence of vapor stripping agent, said vapor stripping agent having properties such that it is condensable under compaction conditions.

7. A method of compacting particulate material which comprises: contacting particulate material having entrapped non-condensable material associated therewith with a vapor stripping agent to displace the entrapped non-condensable material, passing the thus-contacted particulate material to a compaction zone and compacting said particulate material by the application of pressure in the presence of said vapor stripping agent, said vapor stripping agent having a critical temperature and pressure such that it is condensable under compaction conditions.

8. A method of compacting particulate material which comprises: contacting particulate material having entrapped non-condensable material associated therewith in a stripping zone with a vapor stripping agent to displace the entrapped non-condensable material, passing the thus-contacted particulate material and entrained stripping agent to a compaction zone, and maintaining said compaction zone under an elevated temperature and pressure relative to said stripping zone to compact said particulate material, said vapor stripping agent having a critical temperature and pressure such that it is condensable under compaction conditions.

9. A method of compacting particulate material which comprises: contacting particulate material having entrapped non-condensable gaseous material associated therewith in a stripping zone with steam to displace the entrapped non-condensable material, and then compacting particulate material separated from said stripping zone in the presence of steam under pressure and temperature conditions such that said steam is condensable.

10. A method of compacting particulate material which comprises: contacting relatively warm particulate material having entrapped non-condensable gaseous material associated therewith in a stripping zone with relatively cold carbon dioxide under conditions to vaporize said carbon dioxide, thereby cooling said particulate material to a temperature substantially below the critical temperature of carbon dioxide, passing thusly cooled particulate material to a compaction zone and compacting said particulate material under pressure and temperature conditions such that said carbon dioxide is condensable.

11. A method of compacting particulate material which comprises: countercurrently contacting particulate material having entrapped non-condensable gaseous material associated therewith in a stripping zone with a vapor stripping agent to displace the entrapped non-condensable material, and then compacting particulate material separated from said stripping zone by the application of pressure in the presence of vapor stripping agent, said vapor stripping agent having a critical temperature and pressure such that it is condensable under compaction conditions.

12. A method of compacting particulate material which comprises: countercurrently contacting particulate material of fluidizable particle size having entrapped non-condensable material associated therewith in a stripping zone with a vapor stripping agent to maintain a dense fluidized bed of particulate material in said stripping zone and to displace the entrapped non-condensable material, separating thus-contacted particulate material and entrained stripping agent from said stripping zone and compacting said particulate material under pressure in the presence of said vapor stripping agent, said vapor stripping agent having a critical temperature and pressure such that it is condensable under compaction conditions.

13. A method of compacting particulate material which comprises: contacting particulate material having entrapped non-condensable material associated therewith with a vapor stripping agent to displace the non-condensable material, passing the thus-contacted particulate material to a compaction zone, compacting said thus-contacted particulate material by the application of pressure in the presence of said vapor stripping agent, said vapor stripping agent having a critical temperature and pressure such that it is condensable under compaction conditions, and stripping the compacted product with an air-containing stream to recover vapor stripping agent therefrom.

14. A method of compacting particulate material which comprises: preparing such particulate material to a fluidizable particle size under conditions such that air is entrapped therewith, passing said material in countercurrent contact with a vapor stripping agent under conditions to maintain a dense fluidized column of particulate material and to strip air from said particulate material, separating particulate material and entrained vapor stripping agent from the bottom portion of said column, maintaining a separated material under elevated temperature and pressure conditions relative to conditions of said column to produce a compact thereof in the presence of said vapor stripping agent, said vapor stripping agent having a critical temperature and pressure such that it is condensable under compaction conditions, and recovering vapor stripping agent from said compact.

15. The method of claim 14 in which a gaseous mixture comprising vapor stripping agent and air is separated overhead of said fluidized column, said vapor stripping agent is condensed and separated from said air, and said vapor stripping agent is vaporized and returned to said column.

References Cited by the Examiner
UNITED STATES PATENTS 2,517,707  8/1950  Payne _____ 264—85
2,630,623  3/1953  Chisholm et al. _____ 29—420

ROBERT F. WHITE, *Primary Examiner.*